March 13, 1951     B. G. FALCHETTO     2,545,142
FRAME FOR TWO OR THREE WHEELED VEHICLES
Filed April 22, 1947
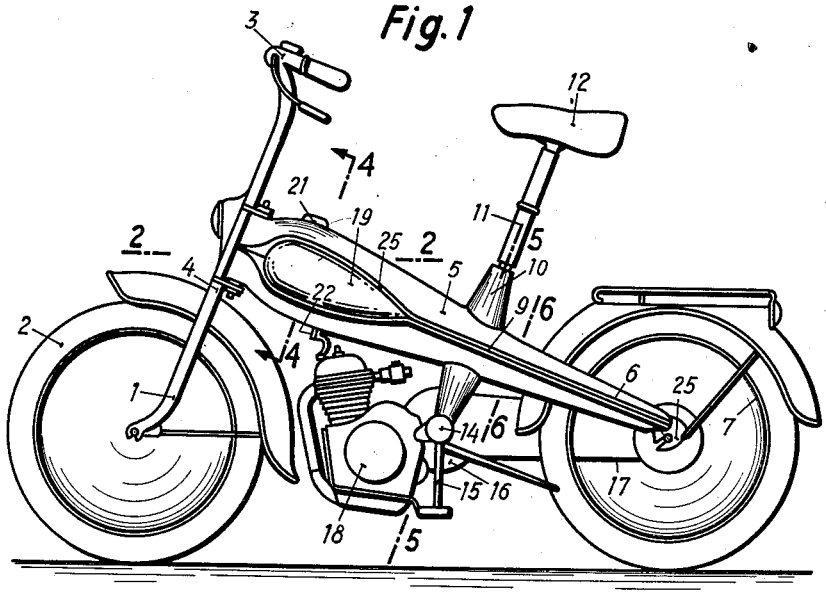
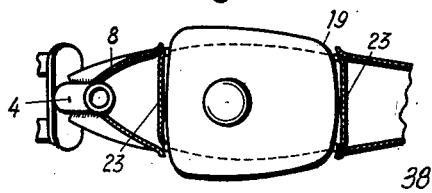
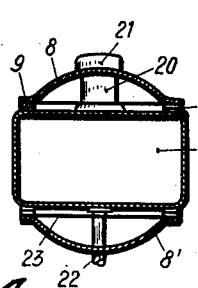
INVENTOR
BATTISTA GIUSEPPE FALCHETTO
by Walter S. Bleston
ATTORNEY Patented Mar. 13, 1951

2,545,142

UNITED STATES PATENT OFFICE 2,545,142

FRAME FOR TWO OR THREE WHEELED VEHICLES

Battista Giuseppe Falchetto, Torino, Italy, assignor to Motom G. m. b. H., Zurich, Switzerland Application April 22, 1947, Serial No. 743,163
In Switzerland April 24, 1946

7 Claims. (Cl. 280—281)

1

The present invention relates to vehicles having two or three wheels, such as bicycles, motor cycles, tricycles and the like, and in particular to a framework for such vehicles essentially made up of a longitudinal beam which, at its front end, forms a seat for the mounting of the front fork and, at the rear end, supports the rear wheel or the axle of the rear wheels.

The present invention has for its object a framework of this kind in which a longitudinal beam extends from the support for the front wheel to the support of the pin of the rear wheel and is formed of two, substantially alike half-shells of stamped sheet metal which are joined together along their adjacent edges.

This framework, the cross-section of which preferably decreases from the front to the rear end, includes, at intermediate points, an upper support for the saddle and a lower extension for carrying the pedal hub and for fixing the motor in the case of a motor cycle, which support and extension have their axes parallel to the axis about which the front fork turns and perpendicular to the axis of the beam which constitutes the framework.

Further objects and details of the invention will be apparent from the description given hereinafter with reference to the accompanying drawing illustrating an embodiment thereof by way of example. In the drawing, Fig. 1 is an elevation of a motor bicycle with a frame according to the invention;

Fig. 2 is a cross-section along line 2—2 of Fig. 1;

Fig. 3 is a cross-section of the front end of a modified frame at the location of the front fork support;

Figs. 4, 5 and 6 are cross-sections along lines 4—4, 5—5 and 6—6, respectively, of Fig. 1, all the cross-sections being on a somewhat larger scale than the elevation of Fig. 1.

Figs. 4a and 5a are cross-sections, corresponding to Figs. 4 and 5, of a modified beam.

Referring now to the drawing, the fork 1 in which the front wheel is mounted in the usual way, and which is in one piece with the handle bar 3, is mounted in an inclined seat formed, for example, by a sleeve 4 fixed to the front end of a hollow substantially rectilinear beam 5, the length of which corresponds to that of the frame of the vehicle, and which at the rear end divides forkwise into two branches 6 between which the rear wheel 7 is supported by any suitable means.

In the embodiment shown, the longitudinal beam 5 is formed by two like half-shells 8, 8' of

2 stamped sheet-metal, of channel section, one with its convex part upwards and the other with its convex part downwards, and both joined together along their lateral edges by welding or clamping.

Along the lateral edges, the two half-shells preferably have an edge 9 projecting outwards as in the example shown or bent inwards so that by the joining together of the two corresponding edges of the two half-shells the beam 5 as a whole is traversed lengthwise by a ribbing projecting on each side.

The cross-section of each half-shell can have any other suitable form and thus be polygonal or round or differently curved. In the case of a curved cross-section, the curve may be more or less pronounced or flattened according to the case.

In addition the cross-section of each half-shell may vary from one zone to the other, both as regards the development of the profile and the form of the latter.

In particular in the example shown, in which the frame is intended for a bicycle, the two half-shells will have a continuous section up to a certain distance from the rear end, and from that point onward they will divide into two branches in order to form the two branches 6 between which the rear wheel 7 is mounted.

The two half-shells 8, 8', when once joined together, constitute a rigid hollow body which forms the frame mounted on the wheels and supporting the various parts of the vehicle.

Thus the sleeve 4 for mounting the front fork is fixed in any suitable way to the front end of the two half-shells 8, 8'.

The attachment of the sleeve 4 to the front end of the beam can be effected as indicated in Fig. 2, in which case the half-shells form, at their front ends, upper and lower recesses creating a seat for the sleeve 4 which is welded to the edges of this seat.

Or else the two half-shells 8 and 8' are traversed near their ends by holes corresponding to each other into which is fitted the sleeve 4 which is welded with its edges to the edges of the holes in the half-shells as indicated in Fig. 3.

In the intermediate part of the beam, the upper half-shell 8 is provided with a projection 10 intended to support a tube 11 on which the saddle 12 is mounted. The hollow projection 10 may be stamped in the half-shell itself or else formed, as shown in Fig. 5, by a tubular piece which is joined on the one hand to the half-shell 8 and on the other to the tube 11.

Similarly, from the lower half-shell 8' of the beam, there extends a hollow projection 13 obtained by stamping or formed by a tubular piece fixed to the half-shell 8' (Fig. 5).

To the lower end of the piece 13, the sleeve 14 is fixed which forms the support for the pedal hub 15. The latter is secured to the sprocket 16 which is in driving connection with the rear wheel 7 by means of a chain 17.

The sleeve 14 is also joined to the lower end of the tube 11 which passes along the entire length of the projections 10 and 13 and through the holes in the half-shells 8, 8', and which is welded to the edges of these holes. In this way there is formed, transversely to the hollow beam formed by the two strips 8 and 8', a strong column which joins the saddle support to the support of the hub.

As will be seen from Figure 1 this transverse column extends at right angles to the axis of the beam formed by the half-shells 8, 8', and the sleeve 4 is likewise at right angles to the said axis.

In this way the half-shells 8 and 8' can be entirely alike, in other words the configuration of the beam is symmetrical with respect to an axial vertical plane and also to another axial plane at right angles to the vertical plane.

In the illustrated embodiment of a motor bicycle, the lower projection 13 also carries a means for attaching the motor 18 for which another means of attachment will be formed in a lower part of the half-shell 8' of the beam.

If the beam forms the frame of a motor bicycle or a motor cycle, its front part will preferably have the half-shells 8, 8' parted over a certain length so as to create a transverse aperture which may be used as the seat for the fuel tank (Figs. 2 and 4).

Inside this aperture each of the half-shells 8 and 8' is lined with a plate 23 welded along its edges in such a manner that each of the branches into which the beam divides has the form of a closed box.

The tank 19 is provided with an inlet tube 20 closed by a cover 21 and with an outlet tube 22. For these tubes holes are made in the upper half-shell 8 and the lower half-shell 8' of the beam respectively.

Preferably, the shape of the tank 19 and, therefore, also that of the space between the two half-shells for the reception of the tank is elongated in the longitudinal direction of the vehicle. Along this space the side edges 9 of the two half-shells 8 and 8' are provided with a lining 24 of yieldable soft material to form an elastic support for the tank 19. In this way the tank is mounted elastically in the frame of the vehicle and the transmission to it of the vibrations of the frame is prevented.

In the illustrated case of a bicycle the beam divides at the rear end into two branches to form the fork in which the rear wheel 7 is placed. The hub of the wheel is supported in suitable seats 25 fixed to the end of the fork branches.

Instead of being divided into a top half-shell and a bottom half-shell, the longitudinal beam might be divided into two lateral half-shells, in which case they would be joined together along an upper edge and along a lower edge. Such structure is shown in Figs. 4a and 5a which are sections corresponding to the sectional Figs. 4 and 5, respectively, of the embodiment first described. In Fig. 4a the two half-shells 38 and 38' are joined along their upper edges at 40 and along their lower edges at 40'. Each half-shell is provided with an opening 41 to the edges of which the aforementioned plate 23 is welded for the reception of the tank 19. In Fig. 5a the tube 11 for the saddle and provided with the sleeve 14 for the pedal hub is passed through recesses 42 of the half-shells and secured to shell projections 43 and 44 which correspond to the projections 10 and 13, respectively, in Fig. 5. Now it will be clear that the half-shells 38 and 38', similarly to the shells 8 and 8', can be entirely alike.

What I claim is:

1. A frame for a vehicle of the type described, comprising a beam having a longitudinal axis and being of a configuration symmetrical with respect to a vertical axial plane and to another axial plane at right angles to said vertical plane, said beam including two projections on opposite sides, said projections having a common axis at right angles to the beam axis, and constituting sockets for a tube supporting a saddle and a pedal crank shaft bearing, said beam being composed of two substantially alike stamped half-shells joined in one of said planes.

2. A frame as claimed in claim 1, said half-shells being joined in said plane at right angles to said vertical plane.

3. A frame for a vehicle of the type described, comprising a beam having a longitudinal axis and being of a configuration symmetrical with respect to a vertical axial plane and to another axial plane at right angles to said vertical plane, said beam being composed of two substantially alike stamped half-shells joined in one of said planes, said beam further including two opposite tubular projections having a common axis in said vertical plane, apertures in the beam wall opening into said projections and a tube for the attachment thereto of supports of a saddle and a pedal crank bearing, said tube extending through said projections and apertures and being bonded to the aperture edges and the outer ends of said projections.

4. A frame as claimed in claim 3, said tubular projections being truncated-cone shaped so as to taper towards their outer ends.

5. A frame for a vehicle of the type described, comprising a beam having a longitudinal axis and being of a configuration symmetrical with respect to a vertical axial plane and to another axial plane at right angles to said vertical plane, said beam being composed of two substantially alike stamped half-shells joined in one of said planes, and including two opposite tubular projections having a common axis in said vertical plane, apertures in the beam wall opening into said projections, a tube extending through said projections and apertures and being bonded to the aperture edges and the outer ends of said projections, the upper tube end being adapted to support a saddle, and means secured to the lower tube end for supporting a motor to drive the vehicle.

6. A frame for a vehicle of the type described, comprising a beam having a longitudinal axis and being of a configuration symmetrical with respect to a vertical axial plane and to another axial plane at right angles to said vertical plane, said beam being composed of two substantially alike stamped half-shells joined in said other plane, each of said half-shells being provided with recesses in its opposite edges, so as to receive a fuel tank in said recesses of said two half-shells.

7. A frame as claimed in claim 6, further comprising a sheet metal piece secured to the opposite recess edges of each shell so as to form a channel complementing the channel of the other half-shell to a tunnel-shaped structure for the reception therein of the fuel tank.

FALCHETTO, BATTISTA GIUSEPPE.

REFERENCES CITED

The following references are of record in the file of this patent:

UNITED STATES PATENTS

| Number | Name | Date |
|---|---|---|
| 1,797,722 | Franklin et al. | Mar. 24, 1931 |
| 2,080,972 | Seehase | May 18, 1937 |
| 2,093,065 | Anderson | Sept. 14, 1937 |
| 2,276,963 | Griffin | Mar. 17, 1942 |

FOREIGN PATENTS

| Number | Country | Date |
|---|---|---|
| 227,487 | Switzerland | Oct. 1, 1943 |
| 534,825 | Great Britain | Mar. 19, 1941 |
| 875,868 | France | July 7, 1942 |